United States Patent

[11] 3,595,541

[72] Inventors Harold L. Pabich
Des Plaines;
Richard J. Wilson, Rosemont, both of, Ill.
[21] Appl. No. 826,206
[22] Filed May 20, 1969
[45] Patented July 27, 1971
[73] Assignee Nalco Chemical Company
Chicago, Ill.

[54] METHOD AND APPARATUS FOR TREATING
PARTICULATE SOLIDS IN A FLUIDIZED BED
19 Claims, 6 Drawing Figs.
[52] U.S. Cl............................................................. 263/21 A,
34/10, 34/57 A
[51] Int. Cl......................................................... F26b 3/08,
F26b 17/10, F27b 15/00
[50] Field of Search........................................... 263/21, 21
A; 34/57, 57 A, 10

[56] References Cited
UNITED STATES PATENTS
2,300,042 10/1942 Caldwell...................... 263/21 A
2,782,019 2/1957 Turney et al................. 263/21 A
3,250,521 5/1966 Sergent ........................ 263/21 A Primary Examiner—Charles J. Myhre
Attorneys—Kinger, Dorn and Zickert, John G. Premo, Charles W. Connors and Morando Berrettini ABSTRACT: Method and apparatus for treating small size particulate solids in a fluidized bed, and the calcining of particulate magnesium carbonate and magnesium hydroxide, or a mixture thereof in a fluidized bed, wherein the apparatus may include an upstanding tubular member of substantially greater length than width defining a bed area or reaction vessel and means for heating the bed by driving heat through the walls of the tubular member, and including means coacting with the incoming fluidizing gas to enhance even fluidization.

PATENTED JUL 27 1971

INVENTORS
HAROLD L. PABICH
RICHARD J. WILSON
BY
Kinzer, Dorn & Zickert
ATTORNEYS

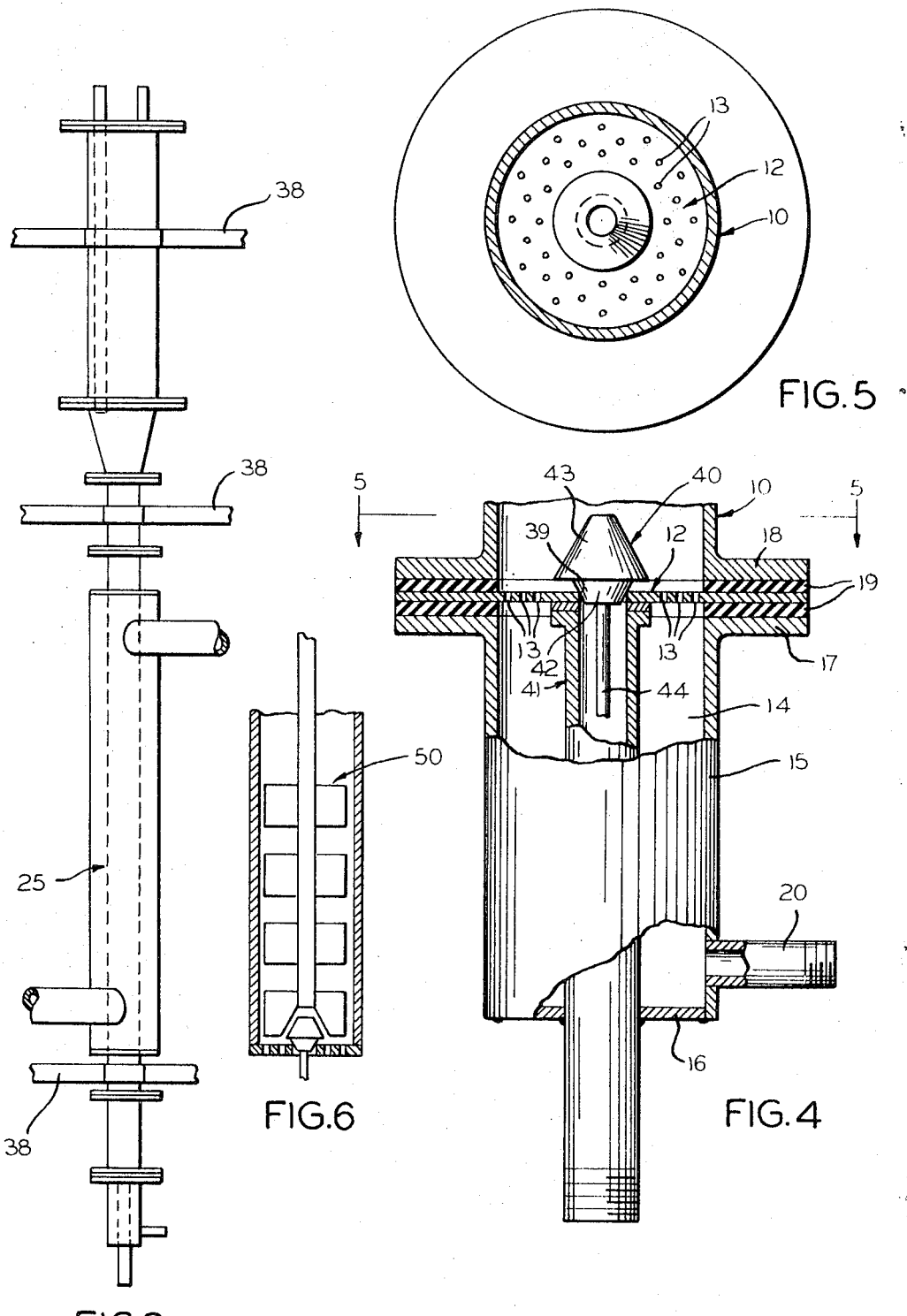

METHOD AND APPARATUS FOR TREATING PARTICULATE SOLIDS IN A FLUIDIZED BED

This invention relates in general to method and apparatus for treating particulate solids in a fluidized bed.

While the present invention is primarily concerned with the treating of particulate magnesium carbonate and magnesium hydroxide, or a mixture thereof, it should be appreciated that other particulate solids can be treated in accordance with the present invention to obtain results not heretofore known. It is well known to treat particulate solids of certain types in a fluidized bed, but it is not believed heretofore known any method for calcining magnesium carbonate and magnesium hydroxide, or a mixture thereof to produce magnesium oxide by using a fluidized bed of small size particles. It has not been heretofore possible to calcine magnesium carbonate and magnesium hydroxide, or a mixture thereof, of small particle size and obtain small particle size magnesium oxide that is highly active. Calcination of larger size particulate magnesium carbonate and magnesium hydroxide has been heretofore accomplished by rotary kiln operation, although the produced magnesium oxide is of less than desirable activity for use by certain industries and small particle size material cannot be treated. All uses of magnesium oxide are now being satisfied by the rotary calcined product. In fact, calcination by rotary kilns results in overheating of small particles and the exterior of large particles, and underheating of the interior of larger particles. This greatly reduces their activity and usefulness and arises from the need to employ high temperatures in the calcination process and the difficulty in heat transfer from the heated wall to the solids being calcined.

One of the difficulties of heretofore manufactured magnesium oxide has been its variable performance when employed as a processing and vulcanization aid in elastomers. Magnesium oxide, generally known as magnesia, as employed during the compounding of elastomers, and it has been found that highly active small particle size magnesium oxide leads to the best state of cure of the elastomer by reason of its excellent dispersion and absorptive and reaction characteristics.

It is therefore an object of the present invention to provide a new and improved method and apparatus for calcining magnesium carbonate and magnesium hydroxide, or a mixture thereof, and more particularly the treating of small particle size materials to obtain small particle size and highly active magnesium oxide having excellent dispersion and absorptive and reaction characteristics especially useful in compounding elastomers.

It is further an object of this invention to provide a method of making magnesium oxide from magnesium carbonate, magnesium hydroxide, or a mixture thereof, by placing the material in a receptacle or reaction vessel and traversing upwardly therethrough sufficient hot gases to produce a fluidized bed and cause the driving off of combined gases and water. In the case of hydrated magnesium carbonate, carbon dioxide and water are removed to produce the magnesium oxide, while in the case of magnesium hydroxide, water is removed to produce the magnesium oxide.

Another aspect of the invention relates to the method of calcining small particle size magnesium carbonate and magnesium hydroxide, or a mixture thereof. In this method, the material to be calcined is placed in an elongated tubular receptacle or reaction vessel. A fluidizing gas is traversed upwardly through the material and uniformly thereacross the receptacle at a relatively low velocity to produce the fluidized bed. While some heat may be supplied to the bed via the fluidizing gas, much or most is supplied through the walls of the vessel to establish a substantially uniform transfer of heat vertically and horizontally of the bed. The proportion of heat supplied through the wall to that from the fluidizing gas is primarily a function of product retention time and calcination temperature. High-temperature liquid, gas, or another fluidized bed may be subjected to the exterior of the bed receptacle to cause the transfer of heat through the receptacle walls and into the product bed. It can be appreciated that small size particle material will not be blown from the bed because only a low-velocity fluidizing gas flow is employed. Essentially, the gases and water are substantially and simultaneously separated from the material which facilitates in providing a controlled atmosphere around the particles in the bed during calcination. Water, carbon dioxide, nitrogen, or other gases may be added to the fluidizing stream to further control the atmosphere around the particles. While this method of the invention is generally described in connection with the handling of small particle size magnesium carbonate and magnesium hydroxide in the production of magnesium oxide, it should be appreciated that this method can well be applied to treat other small particle size material in a fluidized bed. The fluidizing gas normally employed is air, although it can be appreciated that any other type of suitable gas may be employed. Moreover, this method overcomes the difficulties present in rotary kiln calcining by not causing particle over- or underheating which adversely affects the activity of the material.

Accordingly, another object of this invention is to provide a method of treating small size solids in a fluidized bed, and more particularly to calcine small particle size magnesium carbonate and magnesium hydroxide, or a mixture thereof in a fluidized bed.

Heretofore, fluidized beds have been short and wide necessitating the transfer of heat to the solids through the fluidizing gas. The temperature of the fluidizing gas is limited because of product overheating or the inlet construction to the bed cannot withstand the higher temperatures. Accordingly, the heat transfer rate is also limited. There is also a great tendency toward short circuiting or channeling of the heated fluidizing gas in short beds which makes for thermal inefficiency and a poor quality product.

Accordingly, another object of this invention is in the provision of a fluidized bed calciner operating under sufficiently high temperatures and obtaining better and high-heat transfer.

The fluidized bed calciner of the present invention includes an elongated upstanding tube within which the bed is arranged wherein the tube has a substantially greater length than cross-sectional dimension to provide a large area of heat transfer, inasmuch as heat is also driven through the walls of the tube. Because much heat is driven through the walls, the calciner of the present invention needs only a low-velocity fluidizing gas and therefore can handle light, fluffy material or material of small particle size. The material being calcined is introduced into the tube, and sufficient air is injected into the tube at the lower end to achieve fluidization. The high-temperature heat employed as the media for obtaining the calcination of the material in the bed is applied both in the fluidizing gas and by providing a jacket around the tube through which hot flue gases are driven. Because of the relatively small amount of air required for fluidization, all of the heat required for calcination may, if desired, be driven through the wall. The temperature of the bed is substantially the same thereacross and along its vertical length and only slightly lower than the temperature of the inner surfaces of the tube walls, thereby eliminating hot spots that could cause local overheating of the particulate material. The particulate material is therefore heated uniformly and quickly in the bed, thereby providing a more active material as a resulting product. In some cases where channeling in the bed and slugging in the bed may be a problem, satisfactory fluidization may be achieved by pulsing the fluidized gas. If required, mechanical agitation of the bed may be accomplished above or with gas flow by a paddle arrangement, which also increases fluidization efficiency.

In order to obtain calcination of the solids in the bed, the temperature of the bed must be above the threshold energy temperature level of the solids. Below this level, the gases will be driven off very slowly or not at all, although free water will be removed. It can therefore be appreciated that by constructing the bed container essentially long and narrow, and applying much of the heat through the walls of the container, along the entire length of the bed, a large heat transfer surface is provided that results in better and faster heat transfer uniformly to provide a highly active material.

In order to avoid other possible problems in the operation of the bed, a unique discharge arrangement is employed to withdraw the calcined material. The usual distributor plate is provided at the lower end of the tube to support the bed, and holes in the plate permit the introduction of the fluidizing gas upwardly into the bed. The discharge arrangement of the invention includes a valve assembly positioned centrally of the plate. An opening through the plate defines a valve seat, and a valve member having a closure portion coacts with the valve seat to cause selective opening and closing thereof. The valve member also includes a gas velocity control portion in the form of a cone that coacts with the inner tube walls and provides a higher velocity of the fluidizing gas at the distributor plate. The velocity of the gas is gradually decreased above the plate as it moves longitudinally or upwardly through the bed, until it passes the upper end of the gas velocity control portion. Thereafter, the gas velocity becomes constant throughout the bed. This discharge arrangement, together with the gas velocity control portion assures movement and turbulence at the bottom of the bed, thereby reducing chances of slugging and providing even or uniform fluidization throughout the bed.

It is, therefore, a further object of this invention to provide a discharge arrangement in a fluidized bed calciner having means for enhancing uniform fluidization by controlling the velocity of the incoming fluidizing gas.

A still further object of this invention is in the provision of a fluidized bed calciner including an elongated tube for defining the bed area therein, and means for applying the heat to the bed by driving heat through the walls of the tube, thereby obtaining better heat transfer with respect to the bed and ultimately producing a more active product.

Other objects, features and advantages of the invention will be apparent from the following detailed disclosure, taken in conjunction with the accompanying sheets of drawings, wherein like reference numerals refer to like parts, in which:

FIG. 3 is a vertical sectional view of the calciner shown in FIG. 2 and further illustrating support means;

FIG. 4 is a greatly enlarged detail view of the distribution plate and discharge valve with some parts broken away to show underlying parts, and illustrating the valve in closed position;

FIG. 5 is a transverse sectional view taken substantially along line 5—5 of FIG. 4; and FIG. 6 is a partial diagrammatic and sectional view of a fluidized bed calciner according to the invention illustrating a mechanical agitator in the bed.

Figure 2:
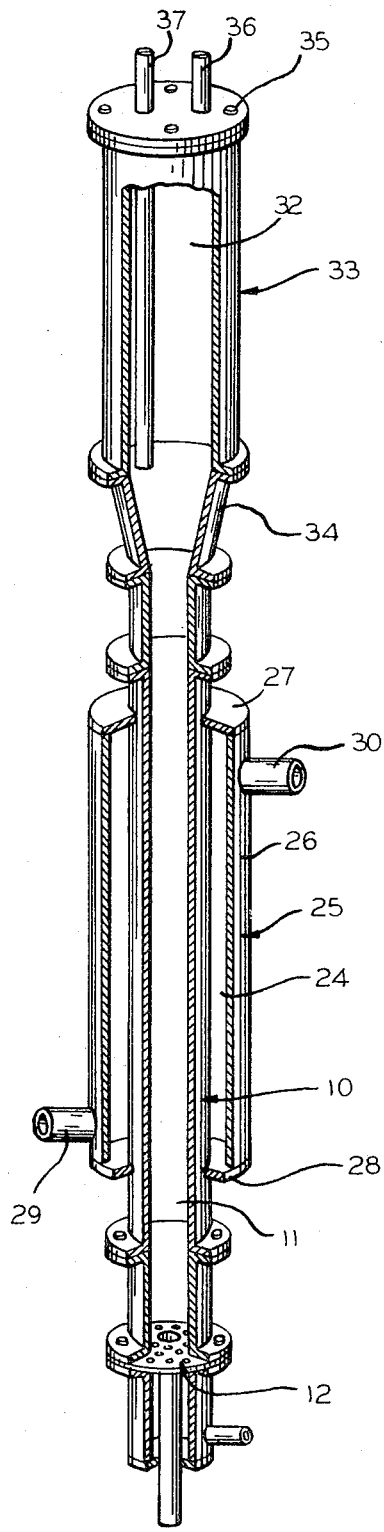
FIG. 2 is a vertical perspective view of the calciner, with some parts broken away and other parts omitted to illustrate underlying parts for purposes of clarity.

The apparatus of the invention, while described in particular with respect to calcining of solids, may be employed for drying of any particulate solid. Difficulty is encountered in the handling of material of small particle size in conventional equipment where the material is essentially light and fluffy. The present invention is especially capable of handling small particle size material, wherein the particle size may be as small as about 1 micron, although it can handle other sized material. Small particle size is intended herein to relate to about 500 microns or less material having a density of about 5—30 pounds per cubic foot. Calcining of solids requires raising the temperature level of the solids above the threshold energy temperature level in order to drive off the gases as well as the water. For materials such as magnesium carbonate and magnesium hydroxide, the threshold energy temperature level is about 550° F.

It has already been mentioned that it is not believed known to recover magnesium oxide from magnesium carbonate and magnesium hydroxide or a mixture thereof by the method of a fluidizing bed. This method, according to the invention, embodies the placing of the solid material to be calcined in a receptacle or a reaction vessel and transversing upwardly through the material hot fluidizing gases that produce a fluidizing bed having a temperature above the threshold energy temperature level of the material and cause the separation of gases and water from the material. Carbon dioxide and water is removed from hydrated magnesium carbonate while water is removed from magnesium hydroxide.

Another part of the invention relates to the method of treating small particle size solids in a fluidized bed where heat is applied to the bed through the walls of the reaction vessel. In this method, an elongated upstanding receptacle or reaction vessel is employed and into which the material to be treated is placed. A fluidizing gas of relatively low velocity is transversed upwardly in the vessel to produce the fluidized bed. Although some heat may be supplied to the bed through the fluidizing gas, much or all of the heat can be supplied by driving same through the walls of the vessel uniformly therearound. This step of the method precludes the blowing of much fine or small particle size material from the bed, and obtains uniform transfer of heat to the bed both vertically and horizontally. Where this method is employed in the calcination of magnesium carbonate, magnesium hydroxide, or a mixture thereof, the gases and water are substantially simultaneously separated from the material, thereby facilitating the provision of a relatively controlled environment or atmosphere around the particles in the bed. The method of the invention further contemplates the optional addition of water to the fluidizing gases to further control the atmosphere around the particles and obtain magnesium oxide having desired characteristics. It will be understood that the fluidizing gas normally employed may be air, although other suitable gases may be used.

It should be appreciated that the method of the invention is especially unique in having the ability to handle small particle size materials at high-heat load and high temperature and relatively low temperature difference. Heat supplied to the bed is not dependent upon the handling of the fluidizing gases as much or all is supplied through the walls of the bed vessel. Transfer of heat by this method is highly efficient. Existing fluidizing bed installations desiring high temperature operation are limited to high-temperature flue gases containing carbon dioxide and water driven through the bed. Therefore, the controlled atmosphere for the materials in the bed established by the method of the present invention is also unique. Accordingly, with the method of the present invention it is possible to carry out chemical reactions involving intimate contact between a particular solid and its surrounding atmosphere at high temperature and high heat load.

The calciner or apparatus of the invention, as illustrated, includes an elongated product tube, preferably cylindrical in shape, that is surrounded by a heat transfer chamber. It will be understood that any number of product tubes may be arranged together in a heat transfer chamber. Flue gases are generated and introduced into the heat transfer chamber, along the outer surface of the tube and out of the chamber for the purpose of driving heat through the wall of the tube and into the fluidized bed maintained therein. A perforated plate is mounted at the lower end of the tube to support the fluidized bed and to permit the introduction of the fluidizing gas to the bed. The plate is perforated so that proper gas distribution is obtained. The solids may be introduced into the bed at the upper end of the tube in any suitable manner. Since the heat transfer is effected through the wall of the tube, light and fluffy materials may be calcined or dried in the bed, because of the low-fluidizing gas velocity.

In order to enhance uniform and even fluidization, a velocity control means is provided at the bottom of the bed adjacent the distribution plate to cause a gradual reduction of velocity from the plate to a point spaced therefrom into the bed. Additionally, this velocity control means generates turbulence at the bottom of the bed and reduces the possibility of slugging or unsteady fluidization. Additional agitation of the bed, if required, is obtained by pulsing the fluidizing gas supply, or by other mechanical means. The fluidizing gas is preferably heated only to a temperature that prevents condensation of water on the metal parts at the lower end of the bed.

Figure 1:
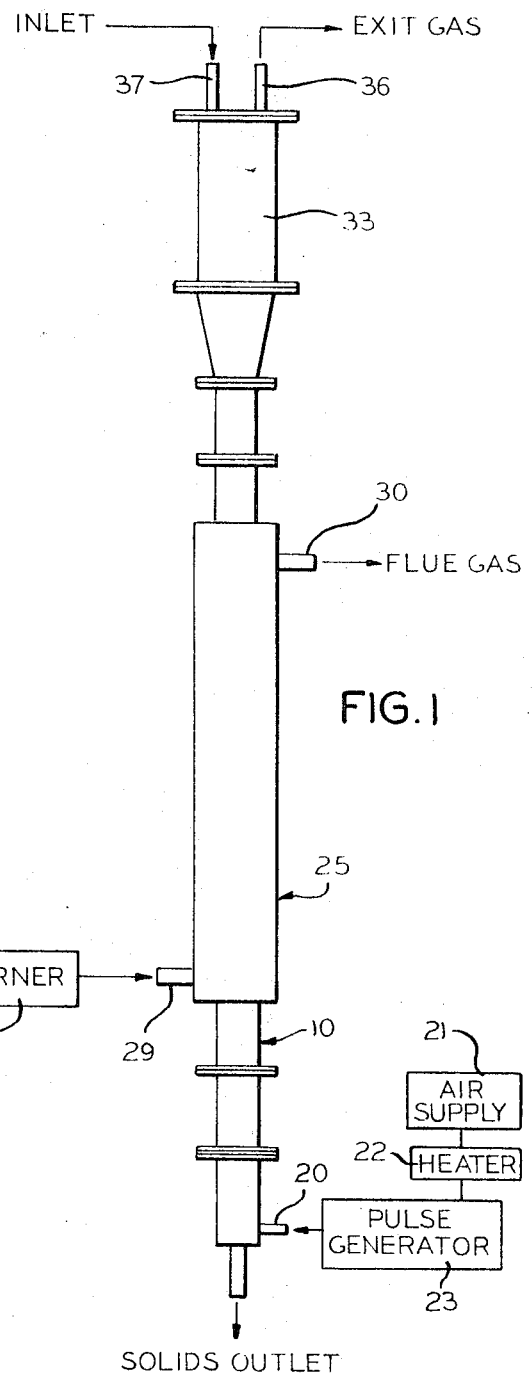
FIG. 1 is a diagrammatic view of a fluidized bed calciner according to the present invention, and illustrating some components in block form.

Referring now to the drawings, FIGS. 1—3 generally illustrate the fluidized bed calciner of the present invention. An upstanding elongated product tube 10 generally defines a fluidized bed or reaction chamber 11. A distribution plate 12 is mounted at the lower end of the bed for the purpose of supporting a bed of fluidizing material within the tube 10, and for permitting the introduction of the fluidizing gas. As seen particularly in FIG. 4, a plurality of air holes 13 are provided in the distribution plate 12 in communication with a fluidizing gas plenum chamber 14 positioned at the lower end of the tube 10 to cause proper distribution of the gases into the bed. The plenum chamber 14 is defined by a cylindrical body 15 closed at its bottom end by a wall 16, and having a radial flange 17 at its upper end that coacts with a flange 18 on the lower end of the tube 10. Suitable gaskets 19 are associated with the distribution plate 12 and the flanges 17 and 18 to seal the tube and cylindrical body together with the distribution plate. A fluidizing gas in the pipe 20 is provided at the lower end of the cylindrical body 15 for introducing a fluidizing gas supply. As seen in FIG. 1, the air supply is represented at 21, which supply is heated to a suitable temperature by a heater 22, and then pulsed by a suitable pulse generator 23 before entering the fluidizing gas chamber 14. The heat needed to perform the calcination is driven through the product tube walls and therefore very little heat is added to the product by the incoming fluidizing gas.

Heat is transferred to the material in the fluidized bed by a heat transfer chamber 24 having supplied thereto a heated fluid of a predetermined temperature. Although the heating fluid hereinafter referred to in describing the invention constitutes high-temperature flue gases, it should be appreciated that the fluid might be any suitable gas, a liquid, or even another fluidized bed. The heat transfer chamber 24 extends substantially along the entire length of the tube 10 and is defined by a jacket 25 that includes a cylindrical wall 26 concentrically spaced relative to the tube 10, and upper and lower end walls 27 and 28. A flue gas inlet 29 is provided at the lower end of the cylindrical wall 26, while a flue gas outlet 30 is adjacent the upper end thereof and preferably at a point diametrically opposite from the side of the wall mounting the inlet. As seen in FIG. 1, a burner 31 supplies the hot flue gases to the heat transfer chamber 24. The inner wall of the jacket 25 is preferably lined with a suitable refractory. At the upper end of the tube 10, a disengaging area or chamber 32 is defined by a cylindrical body 33 of greater diameter than that of the tube 10 and which is interconnected to the tube by means of a tapered fitting 34. The chamber 32 having a volume considerably expanded over that of the tube 10, reduces the velocity of the fluidizing gas and serves to disengage the solids from the gases and prevent blowing or driving out of the fines. The lower end of the cylindrical body 33 is flanged to mate with the flanged end of the tapered fitting 34, while the upper end is flanged and closed with a cover member 35. A fluidizing gas outlet pipe 36 is mounted in the cover member 35 to allow exiting of the fluidizing gas and the gases driven off the solids in the bed. The water in the solids is also carried off as a vapor with the gases. An inlet pipe 37 extends through the cover member 35 and downwardly to the bottom end of the disengaging chamber 32, and serves for the introduction of the product, such as solids or other materials to be treated by the fluidized bed. Although the inlet pipe 37 enables introduction of the product into the upper end of the bed, it could be introduced at any other suitable point. Suitable supports 38, as shown in FIG. 3, may be provided to support the fluidized bed apparatus in an upright and vertical position.

Calcined material may be discharged from the bed in any suitable manner and at any suitable point, such as through the discharge valve arranged centrally of the distribution plate 12 that includes a valve seat 39 and a valve closure member 40. The valve seat 39 is defined by the upper end of an opening formed centrally in the distribution plate 12. Aligning with the opening at the underside of the distribution plate is the upper end of a discharge pipe 41 that extends downwardly through the fluidizing gas chamber 14 and through the bottom wall 16 of the gas chamber body 15. The pipe 41 is suitably arranged in sealing engagement with the distribution plate at its upper end and in sealing engagement with the bottom wall 16 adjacent its lower end.

The valve closure member 41 includes an inverted frustoconically shaped valve closure member portion 32 at its lower end coacting with the valve seat 39, and a conically shaped fluidizing gas velocity control portion 43 at its upper end. A control rod 44 is fastened to the valve closure member 40 at its bottom end and extends downwardly through the discharge or outlet pipe 41 to a suitable mechanism that may apply movement to the valve closure member for opening and closing the valve. The conically shaped fluidizing gas control portion 43, being greater in diameter at the lower end adjacent the distribution plate and diminishing in diameter upwardly to its terminal end, causes the velocity of the fluidizing gas to be greater near the distribution plate and diminishing upwardly along the control portion 43 until it passes the end thereof. This enhances uniform fluidization by assuring movement of the bed and greater turbulence thereof at the bottom adjacent the distribution plate. This also reduces the chances of slugging and uneven fluidization. It should be further recognized that the pulsing of the fluidizing gas causes a form of mechanical agitation of the bed and prevents channeling of the fluidizing gas. The duration and frequency of the pulses may vary, although it has been found that 4 pulses per second has provided satisfactory results. If desired, a rotating paddle 50 as seen in FIG. 6 may be provided in the bed to cause agitation therein.

The elongated tube 10 defining the bed chamber 11 provides better heat transfer to the bed and faster heat transfer than could be obtained heretofore. While the length to diameter ratio of the tube may vary, 10:1 has been found to be satisfactory. Further, the tube 10 may be polygonal in cross-sectional shape if desired. It should be appreciated that in larger size production equipment that a plurality of tubes may be combined in one flue gas chamber to obtain construction economies. The apparatus of the invention may be operated as a batch or continuous process. In fact, a series arrangement or two or more continuous flow fluid bed reactors would increase the uniformity in individual particle residence times and thus improve product activity over that from a single continuous flow reactor, it being appreciated that suitable instrumentation would be provided to effect the type of process desired.

As already mentioned, one of the objectives of the invention is to produce a most active product. Over or underheated particles have suboptimum activity. Thus, it is preferable that the temperature of the fluidized bed be substantially the same across the bed and between the upper and lower ends. Transfer of heat from the flue gases to the bed encounters a poor heat transfer action between the flue gases in the heated transfer chamber 24 and the outer surface of the tube wall, there being a large differential in temperature between the flue gases and the outer wall surface. Substantially no differential in temperature is effected between the outer and inner surfaces of the tube wall, and because of good heat transfer between the inner surface of the wall and the bed, only a small temperature differential exists between the bed and the inner tube wall surface. The heat transfer is facilitated at the inner surface of the tube wall by the fluidized bed. Because of the low-temperature differential between the bed and the inner surface of the tube wall, and the effective narrowness of the bed, the bed particles cannot be overheated. It should be appreciated that the temperature difference between the outer surface of the tube wall and the flue gases could be drastically lessened if required by the incorporation of fins on the outside wall of the tube to increase the heat transfer area. The heat transfer film coefficient could be increased at the outside wall surface by substitution of a nonviscous liquid heating medium for flue gas, or by the use of a second fluidized bed in chamber 24 in which the flue gas would pass through a bed of fluidized silica sand, for example.

In order to best illustrate the operation and capability of the present invention, the following is an example of a fluid bed calcination run.

EXAMPLE

Magnesium carbonate of 30 to 60 mesh having 10 percent water in the amount of 4.74 lbs. was charged to the bed. The flue gas inlet temperature was 1,500° F and the outlet temperature 1,100° F, with a spot temperature of 1,300° F taken within the gas chamber. The outside tube wall temperature measured about 1,065° F, while the inside wall temperature was 1,058° F and the average temperature of the bed material measured about 1,000° F. The maximum temperature differential up and down the bed was measured at about 50° F wherein a temperature reading at the top of the bed measured 975° F, the middle 1,025° F, and the bottom 1,000° F. The fluidizing gas rate was about 0.58 cubic feet per minute, and the fluidizing gas was heated to about 300° F. A pulse rate of about 4 per second for the fluidized gas was also used. The theoretical yield of magnesium oxide was 2.03 lbs., while the theoretical loss of carbon dioxide was 2.21 lbs., while water removed was 0.505 lbs. The actual product yield was 1.45 lbs. The bed was heated for 3 hours and the loss which was the difference between the theoretical yield and the product yield constituted holdup and fines within the bed.

It will be understood that modifications and variations may be effected without departing from the scope of the novel concepts of the present invention.

We claim:

1. A fluidized bed calciner for calcining solids such as magnesium carbonate and magnesium hydroxide or a mixture thereof comprising, an elongated tube of cylindrical cross section having a length substantially greater than the diameter and defining a bed area for receiving solids to be calcined, heat and a fluidizing gas, a gas distribution plate at the lower end of the tube for supporting a bed of solids, gas inlet holes in said plate, means at the lower end of the tube for withdrawing calcined material from said tube, means for supplying a pulsating fluidizing gas to and upwardly through said bed through said distribution plate holes, means defining a heat transfer chamber around said tube along the bed area, said chamber having a uniform cross section along its entire length, and means introducing into said chamber high-temperature fluid for effecting heating of said bed to such a temperature to raise the solids temperature above the threshold energy temperature level.

2. A fluidized bed as defined in claim 1, and a disengaging area above said tube.

3. A fluidized bed as defined in claim 1, wherein said heat transfer chamber includes an inlet and an outlet for passing the high temperature fluid therethrough.

4. A fluidized bed as defined in claim 3, wherein said inlet is located at the lower end of said chamber and said outlet is located at the upper end of said chamber.

5. A fluidized bed as defined in claim 1, wherein said high-temperature fluid is about 1,500° F.

6. A fluidized bed as defined in claim 1, wherein said fluidizing gas is about 300° F.

7. A fluidized bed as defined in claim 1, wherein the length of said tube is about 10 times the diameter thereof.

8. A fluidized bed calciner for calcining solids such as magnesium carbonate and magnesium hydroxide or a mixture thereof comprising, an elongated tube of cylindrical cross section having a length substantially greater than the diameter and defining a bed area for receiving solids to be calcined, heat and a fluidizing gas, a gas distribution plate at the lower end of the tube for supporting a bed of solids, gas inlet holes in said plate, means for withdrawing calcined material from said tube including a valve associated with said distribution plate, means for supplying a fluidizing gas to said bed through said distributor plate holes, means defining a heat transfer chamber around said tube, and means introducing into said chamber high-temperature fluid for effecting heating of said bed to such a temperature to raise the solids temperature above the threshold energy temperature level.

9. A fluidized bed as defined in claim 8, wherein said valve includes an opening in said plate defining a valve seat and a valve closure member coacting with said seat.

10. A fluidized bed as defined in claim 9, wherein said valve is centrally positioned relative said tube and distribution plate.

11. A fluidized bed as defined in claim 10, wherein said closure member includes a lower closure portion coacting with said seat and an upper conically shaped fluidizing gas velocity control portion for causing the gas velocity to be greatest at the distribution plate and gradually decreasing as it moves upwardly into the tube to enhance even fluidization.

12. A fluidized bed calciner comprising an elongated upstanding tube having a length substantially greater than its cross-sectional dimension and defining a bed area therein, a perforated distributor plate at the lower end of the tube for supporting a bed of fluidized material in the bed area and for distributing a fluidizing gas upwardly through the bed, means supplying low-velocity fluidizing gas to said distributor plate, discharge means associated with the lower end of the tube for withdrawing calcined material from the bed, including a valve centrally of said distributor plate, and means for supplying sufficient heat through the walls of the tube to said bed area to cause heat transfer to said bed and establish a threshold energy temperature level of said material sufficient for calcination.

13. A fluidized bed calciner as defined by claim 12, wherein said valve includes an opening in said plate defining a valve seat, and a movable closure member above said plate having a valve portion coacting with said valve seat to selectively open and close same and a fluidizing gas velocity control portion above said plate for causing a higher gas velocity adjacent the plate thereby enhancing even fluidization.

14. A fluidized bed calciner as defined by claim 12, and means for pulsating said fluidized gas supply.

15. The method of treating granular solids of small particle size comprising the steps of, introducing the solids to be treated into an elongated upstanding tubular receptacle, injecting a low-velocity fluidizing gas into the lower end of said receptacle to pass upwardly through the solids and produce a fluidized bed in said receptacle, driving high temperature heat through the sidewalls of the receptacle uniformly along the entire area of the bed to produce a substantially constant temperature through said bed both horizontally and vertically and effect treatment of the solids, and pulsing the fluidizing gas.

16. The method as defined in claim 15, wherein the solids comprise magnesium carbonate and the treatment consists of calcining the carbonate.

17. The method as defined in claim 15, wherein the solids comprise magnesium hydroxide and the treatment consists of calcining the hydroxide.

19. The method as defined in claim 15, wherein the solids comprise a mixture of magnesium carbonate and magnesium hydroxide and the treatment consists of calcining the mixture.

19. A fluidized bed calciner comprising an elongated upstanding tube having a length substantially greater than its cross-sectional dimension and defining a bed are therein, a perforated distributor plate at the lower end of the tube for supporting a bed of fluidized material in the bed area and for distributing a fluidizing gas upwardly through the bed, means supplying low-velocity fluidizing gas to said distributor plate, discharge means associated with the lower end of the tube for withdrawing calcined material from the bed, means for supplying sufficient heat through the walls of the tube to said bed area to cause heat transfer to said bed and establish a threshold energy temperature level of said material sufficient for calcination, and mechanical means in said tube for agitating the material in the bed during calcination.